(12) United States Patent
Epple et al.

(10) Patent No.: US 6,596,817 B2
(45) Date of Patent: Jul. 22, 2003

(54) LOW MOLAR MASS ALIPHATIC POLYESTER POLYOLS, THEIR PREPARATION AND USE IN HIGH PERFORMANCE COATING COMPOSITIONS

(75) Inventors: Ulrich Epple, Graz (AT); Ulrike Kuttler, Vasoldsberg (AT); Adolf Labenbacher, Graz (AT)

(73) Assignee: Solutia Austria GmbH (AT)

( * ) Notice: Subject to any disclaimer, the term of this patent is extended or adjusted under 35 U.S.C. 154(b) by 21 days.

(21) Appl. No.: 09/882,665

(22) Filed: Jun. 15, 2001

(65) Prior Publication Data

US 2002/0026028 A1 Feb. 28, 2002

(30) Foreign Application Priority Data

Jul. 11, 2000 (DE) .......................................... 100 33 512

(51) Int. Cl.⁷ .................. C08L 67/00; C08L 77/00; C09D 133/06; C09D 167/02; C09D 175/02
(52) U.S. Cl. ................. 525/419; 525/124; 525/170; 525/437; 525/439; 525/440; 525/443; 525/444; 523/402; 523/412; 523/415; 523/416; 523/417; 427/385.5; 427/386; 427/393.5
(58) Field of Search ................. 525/124, 170, 525/419, 437, 439, 440, 443, 444; 523/402, 412, 415, 416, 417; 427/386, 385.5, 393.5

(56) References Cited

U.S. PATENT DOCUMENTS 6,309,707 B1 * 10/2001 Mayer et al. ............ 427/385.5
6,436,477 B2 * 8/2002 Laginess et al. ......... 427/372.2
6,512,044 B1 * 1/2003 Wilke ......................... 524/589

FOREIGN PATENT DOCUMENTS

| EP | 0 027 931 A1 | 5/1981 |
| EP | 0 470 461 A2 | 2/1992 |
| EP | 0 635 523 A2 | 1/1995 |
| EP | 0 638 591 A2 | 2/1995 |
| EP | 0 680 977 A1 | 11/1995 |
| EP | 0 714 915 A2 | 6/1996 |
| EP | 0 741 149 A2 | 11/1996 |
| EP | 0 776 920 A2 | 6/1997 |
| EP | 0 896 991 A1 | 2/1999 |
| WO | WO 90/03991 A1 | 4/1990 |

* cited by examiner

Primary Examiner—P. Hampton-Hightower
(74) Attorney, Agent, or Firm—ProPat, L.L.C.

(57) ABSTRACT

Low molar mass polyester polyols having a weight average molar mass $M_w$ of up to 3500 g/mol, hydroxyl numbers of from 80 to 280 mg/g and acid numbers of from 5 to 40 mg/g, comprising structural units derived from aliphatic monocyclic or polycyclic compounds containing at least two hydroxyl and/or epoxide groups and at least one heteroatom, aliphatic acyclic or cyclic polyhydroxy compounds containing three or more hydroxyl groups per molecule, linear or branched aliphatic dihydroxy compounds and aliphatic cyclic polycarboxylic acids, alone or in a mixture with low molar mass acrylate copolymers, may be processed to give coating materials which dry rapidly, and result in defect-free surfaces.

15 Claims, No Drawings

LOW MOLAR MASS ALIPHATIC POLYESTER POLYOLS, THEIR PREPARATION AND USE IN HIGH PERFORMANCE COATING COMPOSITIONS

FIELD OF THE INVENTION

The invention relates to low molar mass aliphatic polyester polyols, to their preparation and to their use in coating compositions.

BACKGROUND OF THE INVENTION

Present-day ready-to-spray clearcoat materials and pigmented topcoat materials, and also primer-surfacer materials, are relatively low in solvents, i.e., they contain fewer volatile organic compounds (VOCs) which are emitted into the atmosphere in the course of the application and drying of said coating materials. These more environmentally friendly coating compositions comprise low molar mass binders and a curing agent. In the case of a two-component (2K) coating composition curing agents are used which react even at low temperature with the functional groups of the binder to form a crosslinked film (usually polyfunctional isocyanates); in the case of one-component (1K) coating compositions, curing agents are used which react only at increased temperature (usually, for example, melamine resins).

In many cases, such binders are hydroxy-functional polyesters or polyacrylates, and also acrylic-modified polyesters or polyester-modified polyacrylates, or mixtures of these resins with one another, or resins of this kind to which reacted diluents have been added.

Reactive diluents are organic chemicals which, in the form of a mixture with the binder, reduce its viscosity, but which are able to react with the respective curing agent. In the case of 2K curing they are, for example, sterically bulky amine compounds (e.g., aspartic esters), blocked amine compounds (e.g., ketimines, aldimines) or blocked β-hydroxyamine compounds (e.g., oxazolidines). Disadvantages of all of these compounds are their intrinsic yellow to brown color, the high yellowing propensity of coating materials comprising them, after application, the short pot life (about 1.5 h, whereas the requirement is for about 8 h, i.e., one working day), and the absence of application reliability under different weathering conditions in practice (e.g., unmasking of the amine compounds by exposure to atmospheric moisture). The pot life (paint processing time) is defined as the time within which the initial viscosity of the ready-to-apply coating material doubles. Accordingly, such compounds are unsuitable as additives for the abovementioned high performance coating systems.

It is also known that the drying rate of the so-called high solids coating materials (with a high mass fraction of solids) may be accelerated by means of external catalysis (for example, with dibutyltin dilaurate, zinc octoate, triethylenediamine, diethylethanolamine, volatile acids, etc.), although this also leads to a severe curtailment of the pot life or paint processing time. Moreover, attempts are made to improve the reactivity with isocyanate curing agents by modifying the binder, by altering the polarity of the polymer framework in the case of acrylate resins (e.g., by introducing carboxyl groups) (cf. EP-A 0 680 977).

Low molar mass polyester resins known to date, with rapid initial drying, contain special, expensive, sterically hindered units and have an acid number of from 5 to 35 mg/g (DE-A 198 09 461) but nevertheless have longer drying times until a dust-dry or tack-free state is achieved than the known systems containing the customary binders of relatively high molar mass. Moreover, coating materials containing these low molar mass polyesters have only a short pot life (about 3 h) and a surface quality (leveling) which is in need of improvement. There is therefore a desire for inexpensive low molar mass polyester resins without these special units and with more rapid drying, a long pot life, and a good surface without a propensity to yellow after application.

SUMMARY OF THE INVENTION

It has surprisingly been found that by using electron-rich heterocyclic functional units containing hydroxyl and/or epoxide groups, and using trifunctional hydroxy compounds additionally to difunctional hydroxy compounds, it is possible for the first time to obtain new low molar mass aliphatic OH-functional polyester resins which exhibit accelerated drying on isocyanate curing while nevertheless showing a sufficiently long pot life (from 6 to 8 h) and good leveling of the paint film and little propensity to yellow after application.

The electron-rich heterocyclic OH-functional and/or epoxy-functional units suitable for the invention are at least difunctional compounds which possess at least one cyclic structure and contain at least, in addition to carbon, hydrogen and oxygen, a heteroatom such as nitrogen, sulfur or phosphorus. This heteroatom is preferably in the vicinity of, and in particular positioned alpha to, a carbonyl function. A particularly suitable heteroatom is nitrogen. Examples of OH-functional monomer units of this kind are 4,5-dihydroxy-N,N'-dimethylolethyleneurea or trishydroxyethyl isocyanurate (1,3,5-tris (2-hydroxyethyl)-1,3,5-triazine-2,4,6-(1H,3H,5H)-trione). An example of an epoxy-functional unit is triglycidyl isocyanurate.

DETAILED DESCRIPTION OF THE PREFERRED EMBODIMENTS

The invention accordingly provides low molar mass polyester polyols having a weight-average molar mass $M_m$ of up to 3500 g/mol, having hydroxyl numbers of from 80 to 280 mg/g and acid numbers of from 5 to 40 mg/g, containing the following mole fractions (in %=mol/100 mol) of structural units derived from a) from 1 to 18%, preferably from 3 to 15%, with particular preference from 5 to 12%, of aliphatic monocyclic or polycyclic polyhydroxy or polyepoxy compounds A containing at least two hydroxyl and/or epoxy groups and at least one heteroatom, preferably a nitrogen atom, which is preferably positioned alpha to a carbonyl group, b) from 1 to 30%, preferably from 3 to 25%, with particular preference from 5 to 20%, of aliphatic acyclic or cyclic polyhydroxy compounds B containing three or more hydroxyl groups per molecule, c) from 15 to 50%, preferably from 20 to 45%, with particular preference form 25 to 40%, of linear or branched aliphatic dihydroxy compounds C, d) from 25 to 60%, preferably from 30 to 55%, with particular preference from 35 to 50%, of aliphatic cyclic polycarboxylic acids D
and e) from 0 to 20%, preferably from 1 to 15%, with particular preference from 2 to 10%, of polyfunctional compounds E selected from aliphatic linear and branched dicarboxylic acids, aromatic dicarboxylic acids and polycarboxylic acids containing three or more carboxyl groups per molecule, and also f) from 0 to 15%, preferably from 1 to 12%, with particular preference from 2 to 10%, of monofunctional units F selected from monocarboxylic acids, monoalcohols and monoepoxides, the ratio of the sum of the amounts of substance of hydroxyl groups and epoxide groups of the components A and B and the amount of substance of hydroxyl groups of the component C being at least 1 or greater than 1, and the mole fractions indicated respectively under a), b), c), d), e) and f) adding up to 100%.

The acid number is defined in accordance with DIN EN ISO 3682 as the ratio of that mass $M_{KOH}$ of potassium hydroxide which is required to neutralize a sample for analysis to the mass $m_B$ of the sample (mass of the solids in the sample in the case of solutions or dispersions); its customary unit is mg/g. The hydroxyl number is defined in accordance with DIN EN ISO 4629 as the ratio of that mass $m_{KOH}$ of potassium hydroxide which has exactly the same number of hydroxyl groups as a sample for analysis to the mass $m_B$ of said sample (mass of the solids in the sample in the case of solutions or dispersions); its customary unit is mg/g.

The aliphatic monocyclic or polycyclic polyhydroxy or polyepoxy compounds A have preferably 5- or 6-membered rings in which at least one atom is other than carbon and is preferably a nitrogen atom. The carbonyl group preferably adjacent to the nitrogen atom is likewise preferably part of the ring. Particular preference is given to those compounds A having two or three nitrogen atoms in one ring. The hydroxyl groups are preferably present in methylol, hydroxyethyl or 2-hydroxypropyl groups. Examples of suitable compounds are N,N'-dimethylol-2-imidazolidone, N,N'-dimethylol-4,5-dihydroxy-2-imidazolidone, the reaction products of parabanic acid or 2-imidazolidone (ethyleneurea) with oxirane or methyloxirane having in each case two hydroxyl groups, and the reaction products of glycoluril (acetyleneurea) with formaldehyde, oxirane or methyloxirane, ranging up to the corresponding tetrahydroxymethyl, tetrahydroxyethyl or tetrahydroxypropyl glycolurils. A particularly preferred compound is the abovementioned trishydroxyethyl isocyanurate or the homologous trishydroxypropyl isocyanurate obtainable by reaction with methyloxirane. It is also possible to prepare mixed hydroxyalkyl derivatives by reacting mixtures of oxirane and methyloxirane with isocyanuric acid. The reaction of epichlorohydrin with isocyanuric acid produces triglycidyl isocyanurate, which is preferred as a polyepoxy compound. Other epoxy-functional compounds A may be prepared similarly by reacting epichlorohydrin with the aforementioned cyclic ureas, examples being diglycidylethyleneurea, diglycidylparabanic acid or tetraglycidylacetyleneurea. By reaction with mixtures of, for example, oxirane or methyloxirane with epichlorohydrin it is possible to prepare compounds A with mixed functionalities.

The aliphatic acyclic or cyclic polyhydroxy compounds B containing three or more hydroxyl groups per molecule have preferably from 3 to 20, more preferably from 3 to 12 carbon atoms and may also be linear or branched. Examples of suitable compounds are glycerol, trimethylolethane, trimethylolpropane, 1,2,6-trihydroxyhexane, 1,2,3-trihydroxyheptane, erythritol, pentaerythritol, sorbitol, xylitol, and mannitol, and also ditrimethylolethane, ditrimethylolpropane, diglycerol and dipentaerythritol. It is also possible to use reaction products of these compounds with oxirane or methyloxirane.

The linear or branched aliphatic dihydroxy compounds C have preferably from 2 to 20 carbon atoms, in particular from 2 to 9 carbon atoms. Preference is given to primary, and particular preference to diprimary, hydroxy compounds. Examples of suitable compounds are glycol, 1,2- and 1,3-propanediol, 1,4-butanediol, 1,6-hexanediol, neopentyl glycol, 2-methyl-1,3-propanediol, 2-methyl-2-butyl-1,3-propanediol, 2,2,4-trimethyl-1,3-pentanediol, pinacol, bishydroxymethylheptane, and 2,2,4- and also 2,4,4-trimethyl-1,6-hexanediol. Particular preference is given to the use of mixtures of linear and branched dihydroxy compounds.

The aliphatic cyclic polycarboxylic acids D have from 6 to 12 carbon atoms and are preferably selected from the cyclic dicarboxylic acids 1,2- and 1,4-cyclohexanedicarboxylic acid and the dicyclic dicarboxylic acids cis-5-norbornene-endo-2,3-dicarboxylic acid and methyl-5-norbornene-2,3-dicarboxylic acid and also the cyclic tricarboxylic acid 1,3,5-cyclohexanetricarboxylic acid.

As polyfunctional compounds E it is possible to use aliphatic linear and branched dicarboxylic acids, aromatic dicarboxylic acids and polycarboxylic acids containing three or more carboxyl groups per molecule. Preference is given to aliphatic dicarboxylic acids having from 2 to 40 carbon atoms such as oxalic acid, malonic acid, succinic acid, glutaric acid, adipic acid, suberic acid, sebatic acid, branched aliphatic dicarboxylic acids such as dimethylsuccinic acid, butylmalonic acid, diethylmalonic acid, dimethylglutaric acid and methyladipic acid, and also the hydrogenated fatty acid dimers and mixtures of these compounds; aromatic dicarboxylic and polycarboxylic acids such as phthalic acid, isophthalic and terephthalic acid, 2,3-, 1,4- and 2,6-naphthalenedicarboxylic acid, 4,4'-biphenyldicarboxylic acid, 4,4'-sulfonyldibenzoic acid, 4,4'-diphenyl ether dicarboxylic acid, 4,4'-benzophenonedicarboxylic acid, and also trimellitic acid, trimesic acid, pyromellitic acid, and benzophenonetetracarboxylic acid.

As monofunctional units F it is possible to use aliphatic or aromatic monocarboxylic acids such as acetic acid, ethylhexanoic acid, isononanoic acid or benzoic acid or aliphatic monoalcohols having from 4 to 20 carbon atoms such as ethanol, n-butanol, tert-butanol, amyl alcohol, 2-ethylhexanol, isononyl alcohol or isotridecyl alcohol. Monoepoxides such as the glycidyl esters of branched monocarboxylic acids may also be used.

Instead of the acids and hydroxy compounds, the low molar mass polyester polyols of the invention may also be synthesized using ester-forming derivatives of these compounds, such as esters of the acids with lower aliphatic alcohols (having from 1 to 4 carbon atoms, linear or branched, primary, secondary or tertiary alcohols), preferably methyl esters, acid anhydrides or acid halides, and also esters of the hydroxy compounds with volatile organic acids, such as acetates or propionates, for example.

The low molar mass polyester polyols of the invention are prepared in the conventional manner by mixing the reactants and condensing them together at elevated temperature. The condensation reaction may be accelerated conventionally by removing the water (or other condensates when using derivatives of the acids and alcohols employed) formed during the reaction, by distillation under reduced pressure. The polycondensation may also be conducted in solvents which form an azeotrope with water; the polycondensation may be performed with particular efficiency by distillation, separation of the water, and recycling of the solvent. The polycondensation may also be conducted in the presence of catalysts.

For the present invention it is preferred to prevent discolorations of the polyester polyol produced by adding reducing agents during the condensation. For this purpose it is possible, for example, to use phosphites or compounds of hypophosphorous acid; hydrogen peroxide may also be added.

The low molar mass polyester polyols of the invention may be prepared batchwise (in a batch process) or continuously. Multistage processes at atmospheric pressure and with increased pressure are also possible.

The extremely low molar mass, OH- and COOH-functional polyester polyols of the invention may be dissolved to a selectable extent using freely selectable solvents or solvent mixtures.

The hydroxyl- and carboxyl-containing, low molar mass polyester polyols prepared in accordance with the invention may further be chemically or physically modified, for example, by reaction with isocyanate compounds or compounds containing oxirane groups. On the low molar mass polyester polyol of the invention, the reaction with isocyanate compounds leads to urethane groups. The reaction with the oxirane compounds leads to additional (secondary) OH groups.

It is also possible at the same time to prepare low molar mass urea derivatives, which in the coatings industry lead to what are known as sag-controlled resins. For this purpose, for example, the low molar mass polyester polyol is introduced as a mixture with monoamines or polyamines, and suitable monofunctional or polyfunctional isocyanates are added. In this context it is advantageous to adopt a procedure whereby polyfunctional isocyanates, when using monoamines, and monofunctional or partly blocked polyfunctional isocyanates, when using polyamines, are employed. Suitable amines are primary aliphatic linear or branched or cyclic amines having from 12 to 18 carbon atoms such as butylamine, hexylamine, 2-ethylhexylamine, dodecylamine and stearylamine, aliphatic, alicyclic and aromatic diamines such as ethylenediamine, 1,4-diaminobutane and 1,6-diaminohexane; 1,3-bisaminomethylcyclohexane and 2,2-bis(4-aminocyclohexyl)propane, and also meta-xylylenediamine. Suitable isocyanates are the polyfunctional isocyanates known from paint chemistry such as trimethylene diisocyanate, tetramethylene diisocyanate, pentamethylene diisocyanate, hexamethylene diisocyanate (HDI), 1,2-propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate (TDI), 2,6-tolylene diisocyanate (TDI), 4,4'-biphenylene diisocyanate, 1,5-naphthylene diisocyanate, 1,4-naphthylene diisocyanate, 1-isocyanatomethyl-5-isocyanato-1,3,3-trimethylcyclohexane (IPDI), bis(4-isocyanatocyclohexyl)methane (HMDI), 4,4'-diisocyanatodiphenyl ether, 2,3-bis(8-isocyanatooctyl)-4-octyl-5-hexylcyclohexene, the isomeric trimethylhexamethylene diisocyanates, and tetramethylxylylene diisocyanate (TMXDI). Mixtures of such diisocyanates or polyisocyanates may likewise be used. Suitable monofunctional isocyanates include aliphatic, cycloaliphatic and aromatic isocyanates having up to 25 carbon atoms. Examples are methyl isocyanate, ethyl isocyanate, propyl isocyanate, butyl isocyanate, stearyl isocyanate, phenyl isocyanate, naphthyl isocyanate, tolyl isocyanate, cyclohexyl isocyanate, tert-butyl isocyanate, and 2-ethylhexyl isocyanate. Examples of suitable partly blocked isocyanates are polyfunctional isocyanates (e.g., the difunctional or polyfunctional ones mentioned above) which have been reacted with, for example, monoalcohols. The advantage of such sag-controlled resins is that even relatively high film thicknesses may be produced in a single application without the formation of the defects known as runs or noses, caused by the paint running off from surfaces inclined in relation to the horizontal. Especially in the context of the application of high yield coating materials such as primer-surfacers, pigmented topcoat materials and special clearcoat materials, these problems may be avoided by using binders formulated or modified in this way. Binders which comprise the low molar mass polyester polyols of the invention having this sag-controlled modification possess not only this higher running limit but also good transparency, and make it possible to formulate coating materials having a high solids fraction. In clearcoat materials, accordingly, it is possible to achieve a mass fraction of solids (measured on coating materials having a flow time of 21 seconds from the DIN 4 cup at 23° C.) of 60%, with a running limit of 60 $\mu$m, and the coatings obtained exhibit outstanding optical properties and good gloss.

Moreover, the low molar mass polyester polyols of the invention may have been esterified (modified) with phosphoric acid, at least to a partial extent.

Preferably, the polyester polyols may also be mixed with acrylate copolymers, especially those of low molar mass. Another possibility for modification is for the novel low molar mass polyester polyols to form the basis of (grafted-on) acrylate polymers, as described in EP-A 0 776 920 or in EP-A 0 896 991. In both cases, either the ester resin character (mass fraction of the acrylate component less than 50%) or the acrylate resin character (mass fraction of the acrylate component greater than 50%) predominate. Of course, a composition with equal fractions of ester resin and acrylate resin is also possible.

The invention therefore further provides mixtures comprising the low molar mass polyester polyols and a copolymer prepared separately or in the presence of said polyester polyol by means of free-radical polymerization, the monomer mixture on which the copolymer is based comprising at least one olefinically unsaturated monomer G which is an alkyl ester of an aliphatic linear, branched or cyclic α,β-unsaturated monocarboxylic acid or an alkyl diester of an olefinically unsaturated aliphatic linear, branched or cyclic dicarboxylic acid having from 1 to 20, preferably from 2 to 12, carbon atoms in the linear, branched or cyclic alkyl radical and from 3 to 10, preferably from 4 to 7, carbon atoms in the acid radical of the ester, also at least one hydroxyalkyl ester H of one of the monocarboxylic or dicarboxylic acids mentioned under G, the hydroxyalkyl radical being derived from an at least dihydric aliphatic linear, branched or cyclic alcohol having from 2 to 15, preferably from 3 to 8, carbon atoms, at least one carboxylic acid I selected from the monocarboxylic acids and dicarboxylic acids mentioned under G, in unesterified form or, in the case of the dicarboxylic acids, in a form in which it is monoesterified with one of the alkyl radicals mentioned under G or one of the hydroxyalkyl radicals mentioned under H, and also, if desired at least one further olefinically unsaturated monomer J selected from vinylaromatics such as styrene, α-methylstyrene, vinyltoluene, chlorostyrene, vinyl esters of aliphatic linear, branched or cyclic monocarboxylic acids having from 2 to 20, preferably from 3 to 12, carbon atoms, vinyl halides such as vinyl chloride, vinylidene chloride, unsaturated nitriles such as acrylonitrile and methacrylonitrile, amides and/or diamides of the acids mentioned under I, vinyl ethers and allyl ethers of aliphatic linear, branched or cyclic alcohols havig from 1 to 18 carbon atoms, esters of glycidyl alcohol or methylglycidyl alcohol with olefinically unsaturated carboxylic acids, and olefinically unsaturated ketones having from 4 to 21 carbon atoms.

These mixtures may be prepared by adding the copolymer to the polyester polyol, in which case the mass ratio of the solids fractions of the polyester polyol and of the copolymer is from 1:9 to 9:1, preferably from 7:3 to 3:7. The two components are normally mixed by intimate mixing of the solutions of both components. Such mixtures are referred to as blends.

The mixtures may also be prepared in accordance with the invention preferably such that the monomer mixture on which the copolymer is based is polymerized in the presence of the polyester polyol, in which case the ratio of the mass of the solids fraction of the polyester polyol to the mass of the monomer mixture on which the copolymer is based is from 9:1 to 1:9, preferably from 7:3 to 3:7. Such a polymer is referred to as a partially grafted polymer.

An advantage when using such mixtures or partially grafted polymers to formulate coating materials arises out of the fact that, with comparable performance properties (hardness, drying rate), it is possible to tailor the mass fraction of solids (for a specified flow time) and the hydroxyl number; in the case of a relatively low hydroxyl number, the amount of the curing agent needed for the specified level of properties can be adapted and thus the crosslinking density can be varied for a specified hardness of the coating film.

The monomer mixture comprises in both cases preferably mass fractions of g) from 25 to 80% of alkyl (meth)acrylates G whose alkyl radicals may be linear, branched or cyclic and which have from 1 to 15 carbon atoms, h) from 1 to 35% of hydroxyalkyl (meth)acrylates H whose hydroxyalkyl radicals may be linear, branched or cyclic and which have from 2 to 20 carbon atoms, i) from 0.5 to 20% of $\alpha,\beta$-unsaturated carboxylic acids I, and j) from 0 to 55% of compounds J selected from aromatic vinyl compounds, aliphatic vinyl esters and vinyl ethers, allyl ethers, vinyl halides, olefinically unsaturated ketones, esters of glycidyl alcohol or methyl glycidyl alcohol with olefinically unsaturated carboxylic acids, and nitriles of $\alpha,\beta$-unsaturated carboxylic acids, the sum of the mass fractions of the components G to J necessarily being 100% and the components G to J preferably being selected such that polymerization of this mixture without further additions would result theoretically in an acrylate copolymer having an acid number of at least 5 mg/g and a hydroxyl number of from 30 to 190 mg/g. The polymerization takes place in the presence of known free-radical polymerization initiators and also, if desired, of a regulator.

The component G is preferably selected from esters of acrylic and methacrylic acid with methanol, ethanol, n- and iso-propanol, n-, sec-, iso- and tert-butanol, and also isobornyl and isofenchyl alcohol.

The component H is preferably selected from esters of acrylic and methacrylic acid with glycol, 1,2- and 1,3-propanediol and 1,4-butanediol.

The component I is preferably selected from acrylic and methacrylic acid.

The component J is preferably selected from styrene, the isomeric vinyltoluenes, and $\alpha$-methylstyrene.

In the context of the invention it is a further preferred procedure to conduct the polymerization of the components G to J in the presence of a cyclic compound K, it being possible for said compound K to react with the compounds used as component I and/or with the compounds used as component H to form a copolymerizable compound. Suitable compounds K are epoxides, especially glycidyl esters of alpha-branched aliphatic monocarboxylic acids having from 4 to 12 carbon atoms in the acid group, which react with the acids I to form an unsaturated hydroxy ester, lactones or lactams, which react with the acids I to form an unsaturated acid or with the hydroxyl-containing compounds H to form unsaturated hydroxy compounds or amines. Procedures of this kind are described in EP-A 0 027 931, in WO 90/03991, and in EP-A 0 635 523, 0 638 591, 0 680 977, 0 714 915, and 0 741 149, whose disclosure content insofar as it relates to these processes is incorporated herein by reference.

The low molar mass polyester polyols of the invention—alone and in mixtures—are especially suitable for coatings applications in one- and two-component systems, especially for what are known as high solids systems, i.e., solventborne mixtures with a high mass fraction of solids.

Suitable solvents for the oligoester polyols of the invention and, respectively, for the mixtures comprising said polyols are, for example, aliphatic, cycloaliphatic and aromatic hydrocarbons, such as alkylbenzenes, e.g., xylene, toluene; esters, such as ethyl acetate, butyl acetate, acetates with longer alcohol radicals, butyl propionate, pentyl propionate, ethylene glycol monoethyl ether acetate, the corresponding methyl ether acetate and propylene glycol methyl ether acetate; ethers, such as ethylene glycol monoethyl, monomethyl or monobutyl ether; glycols; alcohols; ketones such as methyl isoamyl ketone, methyl isobutyl ketone; lactones, and mixtures of such solvents. As solvents, it is also possible to use reaction products of lactones with glycols or alcohols.

The present invention additionally provides coating compositions which comprise the low molar mass polyester polyols of the invention or their sag-controlled modifications, in a blend if desired with other organic polyhydroxy compounds or with reactive diluents (low molar mass compounds which, alone or else together with the low molar mass polyester polyols or other co-components, react with the curing agents used). Particularly suitable co-components are acrylate copolymers of the type described above. These high-solids coating compositions are employed in particular in the coating of metal sheets (especially in OEM automotive finishing and refinishing, and for general industrial applications, such as steel bridges, for example), in the coating of plastics and wood, and in the field of coating of textiles, leather, paper, and construction materials.

The low molar mass polyester polyols or their sag-controlled modifications, and mixtures comprising these low molar mass polyester polyols, may be cured cold or at elevated temperature in the presence of appropriate crosslinkers (curing agents).

Suitable curing components in these coating compositions include amino resins, polyisocyanates, or compounds containing anhydride groups, individually or in combination. The crosslinker is added in each case in an amount such that the ratio of the number of OH groups of the low molar mass polyester polyol (or of the mixtures comprising it) to the number of reactive groups of the crosslinker is between 0.3:1 and 3:1.

Amino resins suitable as curing components are preferably urea resins, melamine resins and/or benzoguanamine resins. These are preferably etherified products of the condensation of urea, melamine or, respectively, benzoguanamine with formaldehyde. Suitable mixtures lie in the range from 50:50 to 90:10 for the ratios of the masses of the low molar mass polyester polyols and of the crosslinkers, based in each case on the mass of the solid resin. Suitable phenolic resins and derivatives thereof may also be employed as curing agents. In the presence of acids, e.g., p-toluenesulfonic acid, these crosslinkers result in curing of the coating. Heat curing may be performed conventionally at temperatures from 85 to 200° C. in from 10 to 30 minutes, for example.

For the curing of the products of the invention with crosslinking, polyisocyanates are suitable, especially at moderate temperatures or at room temperature. Suitable polyisocyanate components include in principle all aliphatic, cycloaliphatic or aromatic polyisocyanates known from polyurethane chemistry, individually or in mixtures. Examples of highly suitable polyisocyanates are low molar mass polyisocyanates such as hexamethylene diisocyanate, 2,2,4- and 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and 4,41-diisocyanatodicyclohexylmethane, 2,4'- and 4,4'-diisocyanatodiphenylmethane, and also mixtures of these isomers with their higher homologues, as obtainable in conventional manner by phosgenating aniline/formaldehyde condensates; 2,4- and 2,6-diisocyanatotoluene, and any desired mixtures of such compounds.

It is preferred, however, to use derivatives of these simple polyisocyanates, as are customary in coatings technology. These include polyisocyanates containing, for example, biuret groups, uretdione groups, isocyanurate groups, urethane groups, carbodiimide groups or allophanate groups, as described, for example, in EP-A 0 470 461.

The particularly preferred modified polyisocyanates include N,N',N"-tris(6-isocyanatohexyl)biuret and its mixtures with its higher homologues, and also N,N',N"-tris(6-isocyanatohexyl) isocyanurate and its mixtures with its higher homologues containing more than one isocyanurate ring.

Further compounds suitable for curing at elevated temperature include blocked polyisocyanates, and also polycarboxylic acids and their anhydrides.

The low molar mass polyester polyols of the invention and the mixtures comprising these are especially suitable for preparing high-solids solventborne clearcoat and topcoat materials and also for primer-surfacers.

Coating compositions are prepared by mixing the polyester, polyols (or mixtures comprising these) with the curing agents mentioned-above.

It is also possible for other auxiliaries and additives to be present which are customary in coatings technology but have not yet been mentioned in coating compositions which are prepared with the low molar mass polyester polyols of the invention or mixtures comprising them. These include, in particular, catalysts, leveling agents, silicone oils, additives such as cellulose esters, especially cellulose acetobutyrate, plasticizers, such as phosphates and phthalates, pigments such as iron oxides, lead oxides, lead silicates, titanium dioxide, barium sulfate, zinc sulfide, phthalocyanine complexes, etc., and fillers such as talc, mica, kaolin, chalk, quartz flour, asbestos flour, slate flour, various silicas, silicates, etc., viscosity additives, dulling agents, UV absorbers and light stabilizers, antioxidants and/or peroxide scavengers, defoamers and/or wetting agents, active diluents, and the like.

The coating compositions may be applied to the respective substrate in accordance with known methods, for example, by brushing, dipping, flowcoating or by roller coating or knifecoating, but especially by spraying. They may be applied under hot conditions, and if appropriate may be brought into a ready-to-apply form by injecting supercritical solvents (e.g., $CO_2$). Automotive, industrial, plastics, wood, construction-material and textile coating materials having excellent properties may be obtained with binders or binder mixtures prepared using the low molar mass polyester polyols of the invention. These binders may be used both for producing intermediate coats and for producing pigmented or unpigmented topcoats.

For this purpose the coating materials are generally cured following their application, within the temperature range from −20 to +100° C., preferably from −10 to +80° C.

In the examples which follow, as in the text which precedes them, all figures with the unit "%" are mass fractions (ratio of the mass of the substance in question to the mass of the mixture), unless specified otherwise. Parts are always mass fractions. Concentrations in "%" are mass fractions of the dissolved substance in the solution (mass of the dissolved substance, divided by the mass of the solution).

EXAMPLES

1a) Synthesis of the Polyesters

Polyesters were prepared in accordance with the composition in table 1 (amounts of substance of the reactants used, in mol). For this purpose the starting components were heated under nitrogen at from 190 to 200° C. and the water of reaction formed was removed continuously. The temperature was raised continuously to 220° C. until the acid number was between 20 and 30 mg/g. Thereafter the low molar mass polyester polyol was diluted with butyl acetate to give an approximately 80% strength solution (80 BAC).

TABLE 1

| Starting components | Ex. 1 mol/ (100 mol) | Ex. 2 mol/ (100 mol) | Ex. 3 mol/ (100 mol) | Ex. 4 mol/ (100 mol) |
|---|---|---|---|---|
| THEIC | 8.9 | 8.9 | 9.4 | 8.5 |
| TMP | 13.7 | 13.7 | 14.4 | 13.5 |
| EG | 13.4 | — | 11.6 | 12.7 |
| PG | — | 13.4 | — | — |
| NPG | 19.5 | 19.5 | 18 | 19 |
| HHPSA | 44.5 | 44.5 | 46.6 | 46.3 |

The abbreviations in this table have the following meanings:
THEIC Trishydroxyethyl isocyanurate (1,3,5-tris(2-hydroxyethyl)-1,3,5-triazine-2,4,6-(1H,3H,5H)-trione)
TMP Trimethylolpropane
EG Ethylene glycol
PG 1,2-Propylene glycol
NPG Neopentyl glycol
HHPSA Hexahydrophthalic anhydride (1,2-cyclohexanedicarboxylic anhydride)

The following values were determined on the polyesters from examples 1 to 4:

TABLE 2

Properties of the polyesters

| Polyester polyol from | | Ex. 1 | Ex. 2 | Ex. 3 | Ex. 4 |
|---|---|---|---|---|---|
| Mass fraction of solids | % | 78.5 | 81.0 | 79.5 | 79.0 |
| Acid number | mg/g | 25.3 | 28.0 | 24.6 | 24.0 |
| Hydroxyl number | mg/g | 165 | 165 | 151 | 141 |
| Viscosity in supply form | mPa · s | 18230 | 22586 | 41946 | 29380 |
| Viscosity in 50% strength solution in BAC | mPa · s | 30 | 28 | 31 | 32 |
| Weight-average molar mass $M_w$ | g/mol | 1872 | 2191 | 3127 | 2670 |
| Number-average molar mass $M_n$ | g/mol | 847 | 939 | 1101 | 1113 |
| Polydispersity $U = M_w/M_n$ | | 2.2 | 2.3 | 2.8 | 2.4 |

The mass fraction of solids was determined in accordance with DIN EN ISO 3251, the acid number in accordance with DIN EN ISO 3682, the hydroxyl number in accordance with DIN EN ISO 4629, and the viscosity in accordance with DIN EN ISO 3219; the specifications of these (newer) standards correspond to those of the standards indicated earlier on above. The molar masses were measured by gel permeation chromatography, with calibration being carried out using polystyrene standards in the customary manner.

1b) Preparation of an Acrylate Copolymer

1b1) Precursor: Oligo-polyester Polyol

The polyester polyol prepared as in example 1 was transferred from solution in butyl acetate to solution in an aromatic mixture (solvent naphtha with boiling range between 150 and 180° C., in this case ®Shellsol A from Shell Chemicals, referred to below as SNA) and adjusted to a mass fraction of solids of 78%, determined in accordance with DIN EN ISO 3251).

1b2) Acrylate Copolymer

A reactor equipped with stirrer, heating, cooling system and inert gas inlet and also with addition devices was charged with 135 g of the above-described solution of the oligopolyester polyol from 1b1) and a further 237.4 g of SNA and the mixture was blanketed with nitrogen and heated to the boiling temperature of the mixture of 168° C. Thereafter, 282 g of n-butyl acrylate, 59.4 g of methyl methacrylate, 227.5 g of hydroxyethyl methacrylate, 14.8 g of acrylic acid, 428 g of styrene and 7.9 g of tert-dodecyl mercaptan were metered in via a dropping funnel over the course of 6 hours. At the same time, 19.8 g of di-tert-amyl peroxide dissolved in 99 g of ®Solvent Naphtha 150/180 (SNA, aromatic hydrocarbon mixture with a boiling temperature range under atmospheric pressure of from 150 to 180° C.) were metered in via a separate addition device. After 6 hours had elapsed, initiation was repeated with 2 g of di-tert-amyl peroxide dissolved in 10 g of SNA and reaction was continued for a further 2 hours. The product was then adjusted to a mass fraction of solids of 69.9% (determined in accordance with DIN EN ISO 3251) by adding 100 g of butyl acetate.

The resulting acrylate copolymer 1b2) was highly transparent and had the following characteristics: acid number 11.2 mg/g; hydroxyl number 95.4 mg/g; dynamic viscosity (measured in accordance with DIN EN ISO 3219 at 23° C., supply form, i.e., the dilution mentioned above) 5235 mPa·s; dynamic viscosity (measured in accordance with DIN EN ISO 3219 at 23° C. in a solution diluted with additional butyl acetate to a mass fraction of solids of 50%) 79 mPa·s. The weight-average molar mass $M_w$ was 6805 g/mol, the polydispersity $U=M_w/M_n$ was 3.0 (calibration with polystyrene standards).

1c) Mixture of an Oligopolyester Polyol and a Low Molar Mass Acrylate Copolymer

The polyester polyol from 1b1) was mixed with a low molar mass acrylate copolymer in accordance with example 3 of EP-A 0 680 977 in a proportion such that the ratio of the mass of the polyester polyol to that of the acrylate copolymer was 1:4.

2) Preparation of Ultra High Solids Clearcoat Materials

Clearcoat materials were prepared using the amounts stated in table 3 of the specified components, and these clearcoat materials were then all adjusted to a processing viscosity corresponding to a flow time of 21 s (measured in accordance with DIN 53211 at 23° C.).

TABLE 3

| Binder | | 2 | 3 | 4 | 5 (comparative, EP-A 0 940 415, Ex.3) |
|---|---|---|---|---|---|
| Mass fraction of solids | % | 78.5 | 81 | 79.5 | 79 | 78 |
| Hydroxyl number | mg/g | 165 | 165 | 151 | 141 | 221 |
| Amount of binder | g | 95.5 | 61.75 | 62.9 | 94.9 | 80 |
| Amount of solvent mixture* | g | 26.3 | 12.5 | 17.5 | 26.3 | 15.6 |
| ® Additol XL 480 | g | 0.24 | 0.16 | 0.16 | 0.24 | 0.2 |
| ® Desmodur N 3300 | g | 42.2 | 28.75 | 26.4 | 37 | 47.3 |
| MAK/BGAC mixture (60 g/40 g) | g | 36.7 | 30.1 | 27.6 | 42.7 | 31.5 |
| Flow time | s | 21 | 21 | 21 | 21 | 21 |
| Designation of coating material | | 1 | 2 | 3 | 4 | 5 |

Solvent Mixture:
Mixture of methyl acetate/butyl glycol acetate (BGAC)/methyl amyl ketone (MAK) in a mass ratio of 60:15:25
®Additol XL 480: Leveling agent (Solutia Germany GmbH & Co. KG, Wiesbaden)
®Desmodur N 3300: Polyisocyanate (BAYER AG, Leverkusen)

Using the binder from example 1b2), a further clearcoat material was prepared in accordance with the above formula, and had a mass fraction of solids of approximately 52% with a flow time of 21 seconds. A clearcoat material with a binder according to 1c) had a mass fraction of solids of approximately 50% with the same flow time.

3) Paint Performance Testing of the Ultra High Solids Clearcoat Materials

The coating systems produced under 2) were applied to cleaned glass plates using 200 μm bar coaters and were dried at room temperature (23° C., rel. atmospheric humidity 65%)

TABLE 4

| Designation of coating material | 1 | 2 | 3 | 4 | 5 (comparative) |
|---|---|---|---|---|---|
| Appearance of the coating films | transparent | transparent | transparent | transparent | transparent |

TABLE 4-continued

| Pot life* | h | 6 | 7 | 6 | 6 | 3 |
|---|---|---|---|---|---|---|
| Tack-free time** | h | 3.5 | 4 | 4 | 4 | 4 |
| Mass fraction of solids# | % | 65 | 63 | 63 | 62 | 65 |

*Pot life: Time in hours until the initial viscosity of the coating material doubles
**Tack-free time: Time in hours until the coating film is no longer tacky (thumb testing)
Mass fraction of solids: Mass fraction of solids in the coating material determined in accordance with DIN EN ISO 3251

Result: The mass fractions of solids as used in the clearcoat material are all greater than 60%. All products show rapid initial drying. The pot life of the comparative example is only half as long as that of the coating materials based on the products of the invention.

4) UV Yellowing

Test Specimen:

300 μm wet film drawdown onto white tiles, dried at room temperature for 7 days.

The five tiles with the coating materials comprising the binders of the invention, including the comparative tile, were passed 10, 20, and 30 times through a UV exposure unit (speed 4 m/min, lamp output 2×80 W/cm)

Result: Yellowing was found neither with the coating material comprising the low molar mass polyester polyols of the invention nor with the comparison.

5) Development of Hardness:

The coating systems produced under 2) were applied to clean glass plates using 200 μm bar coaters and following 10 minutes of flashoff were subjected to force drying at 80° C. for 30 minutes.

TABLE 5

| Designation of coating material | 1 | 2 | 3 | 4 | 5 (comparative) |
|---|---|---|---|---|---|
| Dry film thickness (ISO 2808) in μm | 52 | 50 | 50 | 50 | 52 |
| Pendulum hardness (DIN 53157) | | | | | |
| after 1h at RT in s | 153 | 147 | 140 | 139 | 135 |
| after 1d at RT in s | 167 | 183 | 165 | 167 | 147 |

The clearcoat materials comprising the binders 1b2) and 1c) gave pendulum hardnesses of 170 s (drying at 80° C. for 30 minutes as above, measurement after one day of storage at room temperature).

Result: The pendulum hardnesses achieved with the polyesters of the invention, with mixtures of the polyesters with low molar mass acrylate copolymers as per 1c), and also with the one-shot polymer prepared in accordance with 1b2), are outstandingly high. There is no evidence of any reductions in hardness owing to the extremely low molar mass binders.

6) Leveling:

The surface texture (orange peel) of a coating may be assessed objectively using the wavescan method. The reflection of a laser beam (angle of incidence=angle of observation=60°) is measured over a measurement path of 10 cm. The parameter reported is the longwave nature arising from the standardized variance a (of the longwave fraction determined by a Fourier analysis, of characteristic length between 0.6 and 10 mm) of the reflected light intensity $I_s$ along the measurement path of s=0 cm to s=10 cm, calculated in accordance with $$a = \frac{1000}{s \times I^2} \times \int (I_s - I)^2 ds$$

where I is the average reflected light intensity in the measurement path.

The longwave nature is then defined as $$L = 67 \cdot \lg\left(1 + \frac{a}{20}\right)$$

with obvious outliers in the reflection intensity being eliminated for the corrected longwave nature $L_c$. The higher the measured value for the (corrected) longwave nature $L_c$, the greater the extent to which the sample in question exhibits the surface quality referred to as orange peel.

TABLE 6

| Designation of coating material | 1 | 2 | 3 | 4 | 5 (comparative) |
|---|---|---|---|---|---|
| Film thickness in μm | 30 | 30 | 30 | 30 | 30 |
| Lc | 6 | 6 | 7 | 8 | 14 |

Result: The visual impression of the better surface of the coating films produced with the binders of the invention is confirmed by quantification using the wavescan method: whereas the films of the coating materials 1 to 4 exhibit little or no surface irregularities, with the film of the comparative coating material 5 a distinct orange peel texture (orange peel effect) is perceptible.

In the same way, the surface irregularities were compared with the clearcoat materials prepared from 1c) and 1b2). Using a clearcoat material comprising the mixture 1c) values of $L_c$ of from 23 to 24 were obtained, whereas the clearcoat material comprising the one-shot polymer 1b2) gave an $L_c$ value of only 7.

7) Surface of the Sag-Controlled Polyester Polyols

A 2 l three-necked flask was charged with 1206 g of the polyester of the invention from example 2. 18.0 g of isotridecyl alcohol and 6.1 g of m-xylylenediamine were added with stirring. Then 15.1 g of hexamethylene diisocyanate dissolved in 98 g of solvent naphtha 150/180 (®Solvesso 100 from Exxon or ®Shellsol 100 from Shell Chemie) were added, during which the reaction temperature was monitored (exothermic)—max. 35° C.—and the components were stirred together (over the course of about 4 hours). After 4 hours, the reaction temperature was raised to 50° C. and maintained for 3 hours. After this, the mass fraction of isocyanate groups (NCO value) was measured along the lines of DIN EN ISO 11909, and it gave a value of less than 0.1%.

The sag-controlled polyester thus prepared (SCA-PE) is adjusted to a mass fraction of solids of 65% (measured in accordance with DIN EN ISO 3251) by adding butyl acetate.

| Properties: | SCA-PE |
|---|---|
| Mass fraction of solids in %, in accordance with DIN EN ISO 3251 | 65.3% |
| Appearance | slight turbidity (translucent) |
| Graininess (grindometer) | None |
| Rheology: shear rate (1 to 200 and back to 1 s⁻¹) | Thixotropic |

-continued

| Properties: | SCA-PE |
|---|---|

(Grindometer: Measuring instrument for determining the fineness of grind, in accordance with ISO 1524)

8) Preparation of Ultra High Solids Clearcoat Materials With a High Running Limit Using the amounts specified in table 7 of the components mentioned, clearcoat materials were prepared from the sag-controlled polyester polyol (SCA-PE) and were then all adjusted to processing viscosity, corresponding to a flow time of 21 s (measured in accordance with DIN 53211 at 23° C.).

TABLE 7

Composition of the test coating material 6 sca

| Component | |
|---|---|
| Sag-controlled polyester from example 7 | 216 g |
| ® Tinuvin 292 (Ciba Spezialchemikalien) | 1.2 g |
| ® Tinuvin 1230 (Ciba Spezialchemikalien) | 3.5 g |
| ® Tego Glide 450 (Tego Chemie) | 0.1 g |
| ® Metatin (Acima, Buchs) | 2.38 g |
| Methyl amyl ketone/butyl glycol acetate/methoxypropyl acetate (mixture in mass ratio 60:15:25) | 28.1 g |
| Methyl amyl ketone/butyl glycol acetate/methoxypropyl acetate (mixture in mass ratio 60:15:25) | 7.1 g |
| Total | 258.38 g |
| ® Desmodur N 3300 (Bayer AG, Leverkusen) | 106.5 g |
| Spray diluent (methyl amyl ketone/butyl glycol acetate mixture in mass ratio 60:40) | 75 g |
| Mass fraction of solids in the coating material (DIN EN ISO 3251; drying at 125° C., 1h, 2 g sample + 2 ml ethyl acetate) | 60.0% |
| Application viscosity (flow time DIN EN ISO 2431; 23° C., cup no. 4) | 21 s |
| Degree of crosslinking | 100% |

9) Testing of the Clearcoat Materials With and Without Sag-Controlled Modification:

The coating materials 2 (without modification) and 6 sca were sprayed with an increasing dry film thickness ("dry film slope") of from 20 to 70 µm onto perforated metal panels (20×30 cm$^2$) in whose diagonal 15 circular holes with a diameter of 0.5 cm had been made. After 15 minutes of flashing off and subsequent drying at 80° C. for 30 minutes, the running limit was determined (i.e., the point at which runs begin to form at the holes). The surface quality was assessed using the wavescan method (see above) and by measuring the gloss.

TABLE 8

Testing results

| Coating material | 6 sca | 2 (comparative) |
|---|---|---|
| Running limit in µm | 60 | 42 |
| Wave Scan: L$_c$ at 33 µm dry film thickness | 8 | 6 |
| Gloss (Trigloss; 20°, measured at 33 µm dry film thickness) | 88 | 90 |

Result: Using the coating material 6 sca of the invention, which additionally has the sag-controlled modification, it is possible to apply high-build clearcoat materials up to about 60 µm (in comparison to about 40 µm without the aforementioned modification). The clearcoat material 6 sca gives coating films having high surface quality (no orange peel) and outstanding gloss.

What is claimed is:

1. A polyester polyol having a weight-average molar mass M$_w$ of up to 3500 g/mol, having a hydroxyl number of from 80 to 280 mg/g and an acid number of from 5 to 40 mg/g, comprising the stated mole fractions (in %=mol/100 mol) of structural units derived from
    a) from 1 to 18% of aliphatic monocyclic or polycyclic compounds A containing at least two hydroxyl groups and/or epoxide groups and having at least one heteroatom,
    b) from 1 to 30% of aliphatic acyclic or cyclic polyhydroxy compounds B containing three or more hydroxyl groups per molecule,
    c) from 15 to 50% of linear or branched aliphatic dihydroxy compounds C,
    d) from 25 to 60% of aliphatic cyclic polycarboxylic acids D,
the ratio of the sum of the amounts of substance of hydroxyl groups and epoxide groups of the components A and B to the amount of substance of hydroxyl groups of the component C being at least 1 or greater than 1, and the amounts of substance fractions indicated in each case under a), b), c) and d) adding up to 100%.

2. The polyester polyol as claimed in claim 1, comprising mole fractions of up to 20% of structural units derived from polyfunctional compounds E selected from aliphatic linear and branched dicarboxylic acids, aromatic dicarboxylic acids, and polycarboxylic acids containing three or more carboxyl groups per molecule.

3. The polyester polyol as claimed in claim 1, further comprising mole fractions of up to 15% of structural units derived from monofunctional units F selected from monocarboxylic acids, monoepoxides and monoalcohols.

4. The polyester polyol as claimed in claim 1, wherein the heteroatom is nitrogen.

5. The polyester polyol as claimed in claim 4, wherein a carbonyl group is positioned alpha to the nitrogen atom.

6. The polyester polyol as claimed in claim 1, wherein trishydroxyethyl isocyanurate is used as polyhydroxy compound A.

7. A mixture of acrylate copolymers and the polyester polyols of claim 1, wherein an acrylate copolymer is prepared in the presence of the polyester polyol or is added to the polyester polyol following its synthesis, the monomer mixture on which the copolymer is based comprising
    at least one olefinically unsaturated monomer G which is an alkyl ester of an aliphatic linear, branched or cyclic α,β-unsaturated monocarboxylic acid or an alkyl diester of an olefinically unsaturated aliphatic linear, branched or cyclic dicarboxylic acid having from 1 to 20 carbon atoms in the linear, branched or cyclic alkyl radical and from 3 to 10 carbon atoms in the acid radical of the ester,
    also at least one hydroxyalkyl ester H of one of the monocarboxylic or dicarboxylic acids mentioned under G, the hydroxyalkyl radical being derived from an at least dihydric aliphatic linear, branched or cyclic alcohol having from 2 to 15 carbon atoms, and
    at least one carboxylic acid I selected from the monocarboxylic acids and dicarboxylic acids mentioned under G, in unesterified form or, in the case of the dicarboxylic acids, in a form in which it is monoesterified with one of the alkyl radicals mentioned under G or one of the hydroxyalkyl radicals mentioned under H.

8. The mixture as claimed in claim 7, wherein the acrylate copolymer is obtained by polymerizing the components G to I in the presence of a cyclic compound K, it being possible for this compound K to react with the compounds used as component I and/or as component H to form a copolymerizable compound.

9. A coating composition comprising a low molar mass polyester polyol as claimed in claim 1 as binder.

10. A coating composition comprising a mixture as claimed in claim 7 or 8 as binder.

11. The coating composition as claimed in claim 9, comprising further to the binder reaction products of monoamines or polyamines and monofunctional or polyfunctional isocyanates.

12. The coating composition as claimed in claim 11, obtained by reacting monoamines or polyamines wit monofunctional or polyfunctional isocyanates in the presence of a polyester polyol as claimed in claim 1.

13. The coating composition as claimed in claim 10, comprising further to the binder reaction products of monoamines or polyamines and monofunctional or polyfunctional isocyanates.

14. The coating composition as claimed in claim 13, obtainable by reacting monoamines or polyamines with monofunctional or polyfunctional isocyanates in the presence of the mixture of polyester polyols and acrylate copolymers as claimed in claim 5 or 6.

15. A method of use of a coating composition as claimed in claim 9 to produce coatings, comprising applying the coating composition to a substrate by brushing, dipping, flow-coating, roller-coating, knife-coating, or spraying, and thereafter curing within a temperature range of from −20 ° C. to 200° C.

* * * * *